US 6,470,369 B1

(12) United States Patent
Ikegami

(10) Patent No.: US 6,470,369 B1
(45) Date of Patent: Oct. 22, 2002

(54) EUCLID MUTUAL DIVISION ARITHMETIC CIRCUIT AND PROCESSING CIRCUIT

(75) Inventor: Maki Ikegami, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/421,672

(22) Filed: Oct. 20, 1999

(30) Foreign Application Priority Data

Feb. 3, 1999 (JP) .......................................... 11-026091

(51) Int. Cl.7 ................................................. G06F 7/72
(52) U.S. Cl. ........................................ 708/491; 714/784
(58) Field of Search ................................ 708/491, 492, 708/650, 653; 714/784

(56) References Cited

U.S. PATENT DOCUMENTS 4,881,193 A * 11/1989 Hamada et al. ............. 708/650
5,325,373 A * 6/1994 Iwamura et al. ............ 714/784
6,163,790 A * 12/2000 Monier ....................... 708/491
6,341,297 B1 * 1/2002 Tezuka ...................... 708/492
6,374,384 B1 * 4/2002 Ohta et al. .................. 714/784

* cited by examiner

Primary Examiner—David H. Malzhan
(74) Attorney, Agent, or Firm—Rabin & Berdo, P.C.

(57) ABSTRACT

The Euclid mutual division arithmetic circuit relating to the present invention comprises first, second, and third register portions and control portion. Each register portion is constituted so as to be able to selectively perform a Euclid mutual division, perform Euclid mutual division using a divisor and dividend, supply the divisor used in the Euclid mutual division operation, and supply the dividend used in the Euclid mutual division operation. The control portion operates so that, in a kth operation, the first register portion supplies the dividend, the second register portion performs the division operation, and the third register portion supplies the divisor supplying function; in a (k+1)th operation, the first register performs the division operation, the second register portion supplies the divisor, and the third register portion performs the dividend. In a (k+2)th operation, the first register portion supplies the divisor, the second register supplies the dividend, and the third register portion performs the division operation. This Euclid mutual division arithmetic circuit can operate at high speeds because a subsequent operation is performed without data transfer, once a first operation is complete.

20 Claims, 5 Drawing Sheets

EUCLID MUTUAL DIVISION ARITHMETIC CIRCUIT AND PROCESSING CIRCUIT

BACKGROUND OF THE INVENTION

1. Field of the Invention

The present invention relates to a circuit for executing the operations for Euclid mutual division and a processing circuit including this mutual division arithmetic circuit. This processing circuit is used in data error control for telecommunications devices, for example.

2. Description of Related Art

Euclid mutual division is an operation for repeated division using two integers or natural numbers as the initial values. Euclid mutual division is expressed with equation (1), where the initial value of the dividend is a, and the initial value of the divisor is $a_2$. In this equation, '$q_n \ldots a_m$' is used to express that $q_n$ is the quotient and $a_m$ is the remainder.

$$a_1/a_2 = q_1 \ldots a_3$$

$$a_2/a_3 = q_2 \ldots a_4$$

$$a_3/a_4 = q_3 \ldots a_5$$

$$\cdot$$

$$\cdot$$

$$\cdot$$

$$a_{n-1}/a_n = q_{n-1} \ldots a_{n+1} \qquad (1)$$

This equation can be iterated until the remainder becomes zero.

The following are necessary in order to execute Euclid mutual division with a logic circuit: a dividend storing portion for storing the number to be the dividend, or numerator; a divisor storing portion for storing the number to be the divisor, or denominator; and a computing portion to which the dividend and divisor are input and which computes the remainder. After performing division once, this logic circuit transfers the data stored in the divisor storing portion to the dividend storing portion, transfers the remainder data calculated by the computing portion to the divisor storing portion, and executes division again. The time necessary for these data transfers becomes an issue in reducing the speed of the Euclid mutual division arithmetic.

SUMMARY OF THE INVENTION

It is an object of the present invention to provide a Euclid mutual division arithmetic circuit, which can perform the Euclid mutual division operations at high speed, and a processing circuit including this Euclid mutual division arithmetic circuit.

For this reason, the Euclid mutual division arithmetic circuit relating to the first invention in this application comprises: first, second, and third register means for selectively executing a function for computing the Euclid mutual division operations using the divisor and dividend, a function for supplying the divisor used in the Euclid mutual division operations, and a function for supplying the dividend used in the Euclid mutual division operations; (that is, selectively performing the operations, supplying the divisor and supplying the dividend) and means for controlling the first, second, and third register means so that, in the kth operation, the first register means execute the dividend supplying function, the second register means execute the computing function, and the third register means execute the divisor supplying function, and in the (k+1)th operation, the first register means execute the computing function, the second register means execute the divisor supplying function, and the third register means execute the dividend supplying function, and in the (k+2)th operation, the first register means execute the divisor supplying function, the second register means execute the dividend supplying function, and the third register means execute the computing function.

After the first operation is complete, the Euclid mutual division arithmetic circuit relating to the first invention in this application can execute the next operation without transferring data; this circuit can therefore operate at high speeds.

The processing circuit relating to the second invention in this application comprises: a Euclid mutual division arithmetic circuit comprising first, second, and third register means for selectively executing a function for computing the Euclid mutual division using the divisor and dividend, a function for supplying the divisor used in the Euclid mutual division operations, and a function for supplying the dividend used in the Euclid mutual division operations; and means for controlling the first, second, and third register means so that, in the kth operation, the first register means execute the dividend supplying function, the second register means execute the computing function, and the third register means execute the divisor supplying function, and in the (k+1)th operation, the first register means execute the computing function, the second register means execute the divisor supplying function, and the third register means execute the dividend supplying function, and in the (k+2)th operation, the first register means execute the divisor supplying function, the second register means execute the dividend supplying function, and the third register means execute the computing function; as well as a multiplier circuit for multiplying the quotient calculated by this Euclid mutual division arithmetic circuit by a predetermined number.

The processing circuit relating to the second invention in this application can perform the Euclid mutual division operations at high speeds, and can therefore carry out processing at high speeds.

BRIEF DESCRIPTION OF THE DRAWINGS

Other objects and advantages of the present invention are explained with reference to the following attached drawings.

DESCRIPTION OF THE PREFERRED EMBODIMENTS

Figure 1:
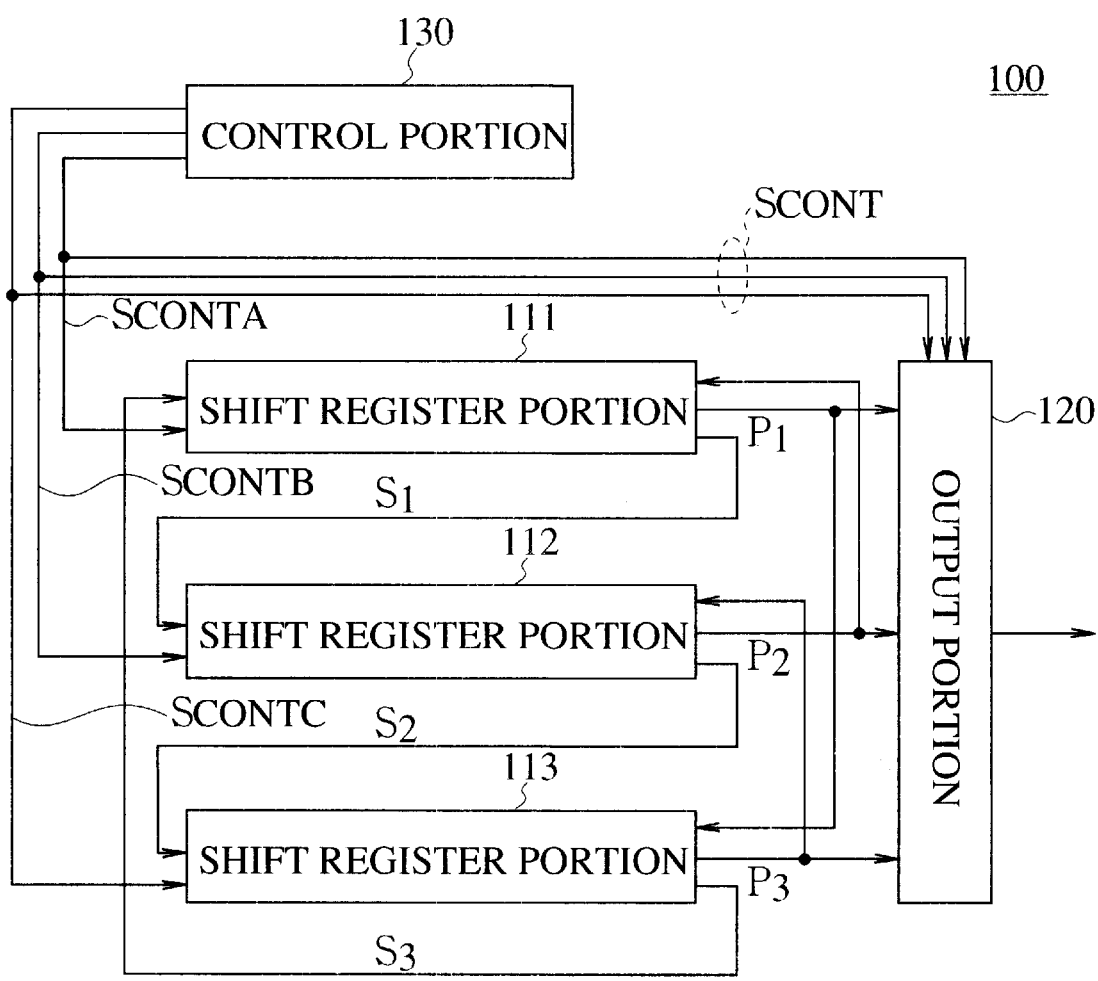
FIG. 1 is a block diagram showing the entire constitution of the Euclid mutual division arithmetic circuit relating to the first embodiment.

The preferred embodiments of the present invention are explained below using the drawings. In the drawings, the sizes, forms, and relative positions of the elements are merely for illustrative purposes so that the present invention can be understood; the numerical conditions in the explanation below are merely examples.

First Embodiment

The first embodiment of the Euclid mutual division arithmetic circuit relating to the present invention is explained using FIGS. 1 to 4.

As shown in FIG. 1, the Euclid mutual division arithmetic circuit 100 comprises shift register portions 111, 112, 113, an output portion 120, and a control portion 130.

The shift register portions 111 to 113 are each provided the dividend supplying function, remainder computing function, and divisor supplying function. As discussed below, the shift register portions 111 to 113 are each provided a plurality of stages of flip-flops. Each flip-flop holds coefficients $\alpha_{n-1}, \alpha_{n-2}, \ldots \alpha_0$ when data are expressed as $\alpha_{n-1}X^{n-1} + \alpha_{n-2}X^{n-2} + \ldots + \alpha_1 X + \alpha_0$. The coefficients $\alpha_{n-1}$ to $\alpha_0$ are each a prescribed number of bits of binary data. The shift register portions 111 to 113 comprise means for outputting these coefficients, one at a time as timed by the clock, and means for outputting these coefficients simultaneously as timed by one clock. In this application, the former output signal is called the "serial signal" and the latter output signal is called the "parallel signal". In other words, the serial signal in this application actually includes the case where a plurality of bits of data, for expressing one coefficient, are output in parallel.

The shift register portion 111 outputs the serial signal $S_1$ to the shift register portion 112 and the parallel signal $P_1$ to the shift register portion 113 and the output portion 120. The shift register portion 112 outputs the serial signal $S_2$ to the shift register portion 113 and the parallel signal $P_2$ to the shift register portion 111 and output portion 120. The shift register portion 113 outputs the serial signal $S_3$ to the shift register portion 111 and the parallel signal $P_3$ to the shift register portion 112 and output portion 120.

The divisor from the shift register portion executing the divisor supplying function, and the remainder from the shift register portion executing the remainder computing function are input to the output portion 120. The output portion 120 then outputs the divisor and remainder to the next stage circuit, not shown.

Using control signals $S_{CONTA}$ to $S_{CONTC}$, the control portion 130 controls the shift register portions 111 to 113 and output portion 120. The control signals $S_{CONTA}$ to $S_{CONTC}$ are signals for determining the functions carried out by the shift register portions; these functions are the dividend supplying function, remainder computing function, and divisor supplying function, respectively.

Figure 2:
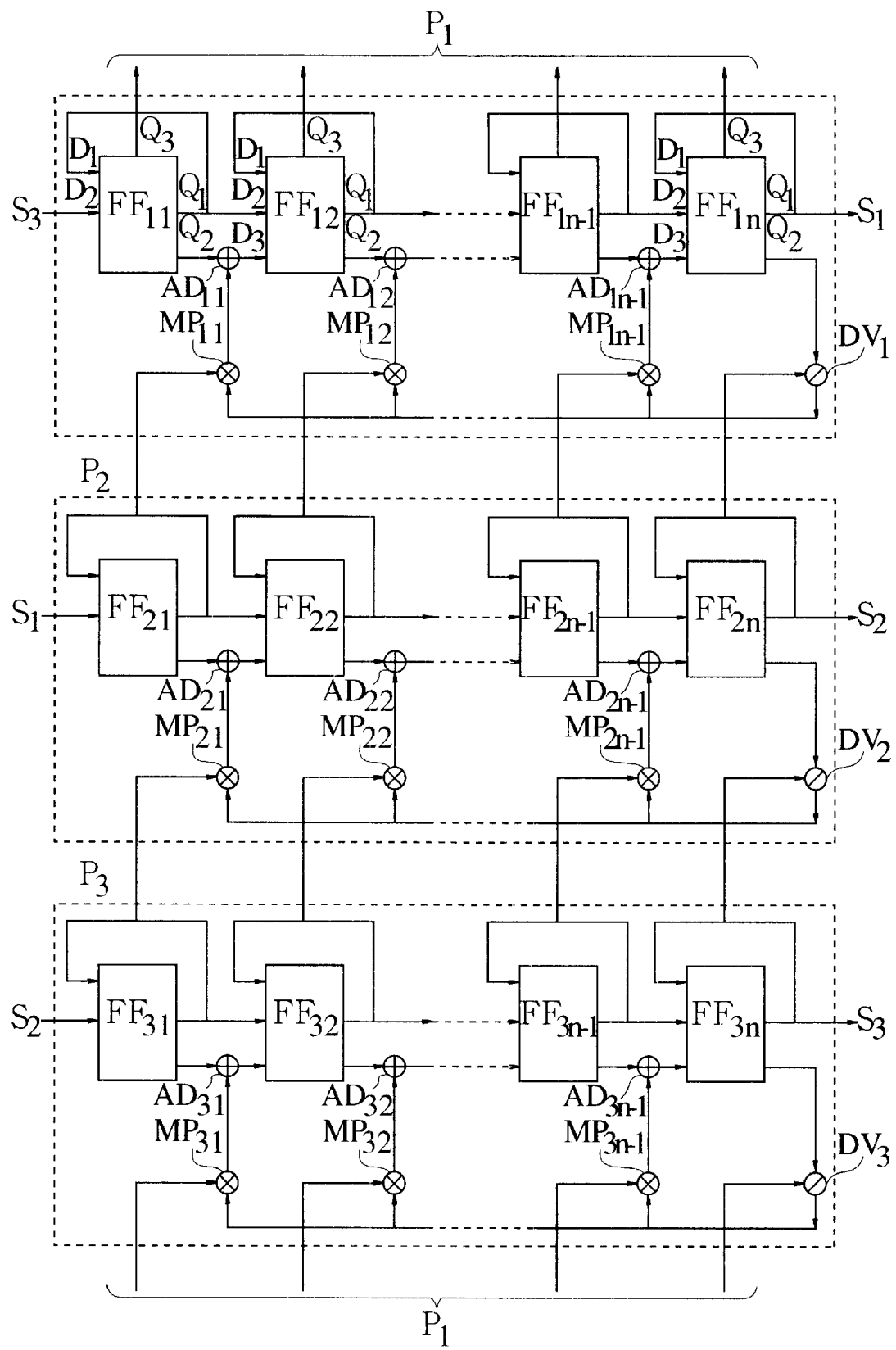
FIG. 2 is a block diagram showing the internal constitution of each shift register portion shown in FIG. 1.
Figure 3:
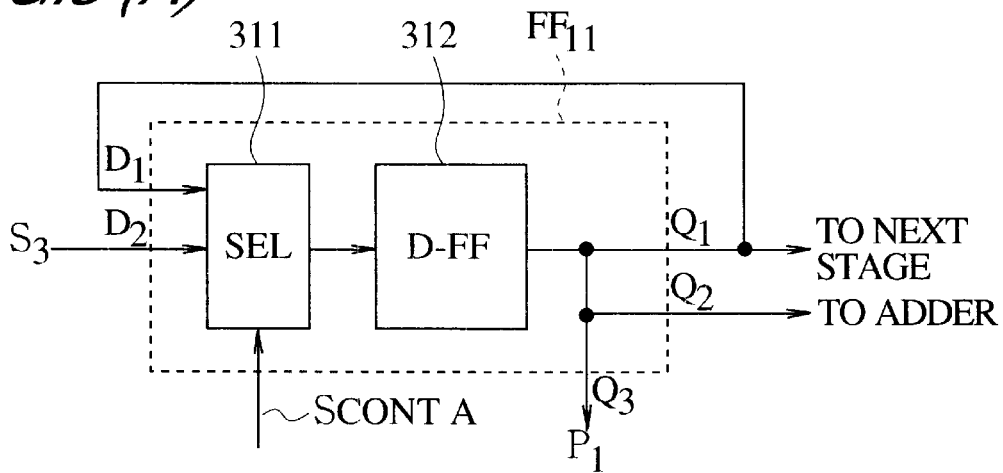
FIGS. 3(A) to 3(C) show block circuit diagrams of the internal constitution of the flip-flop portions shown in FIG. 2.
Figure 3:
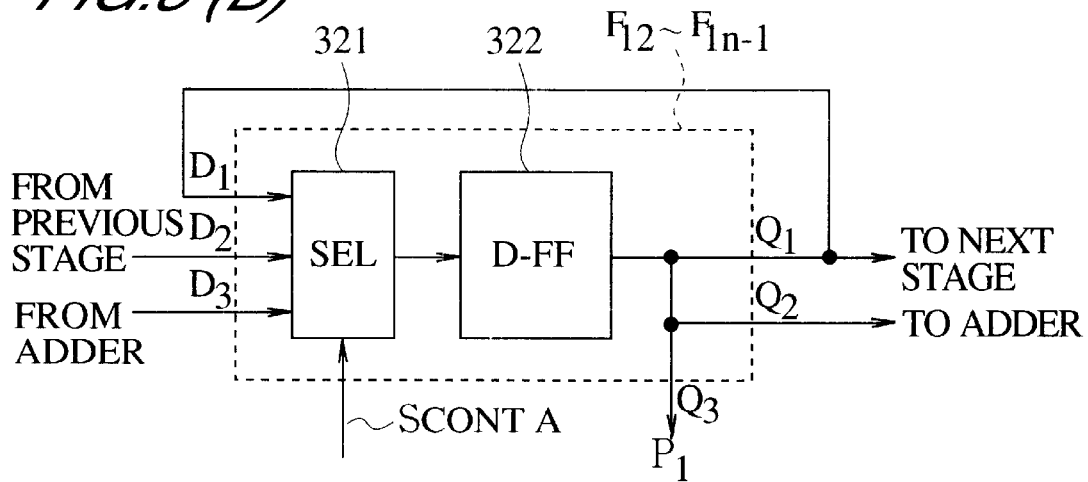
Figure 3:
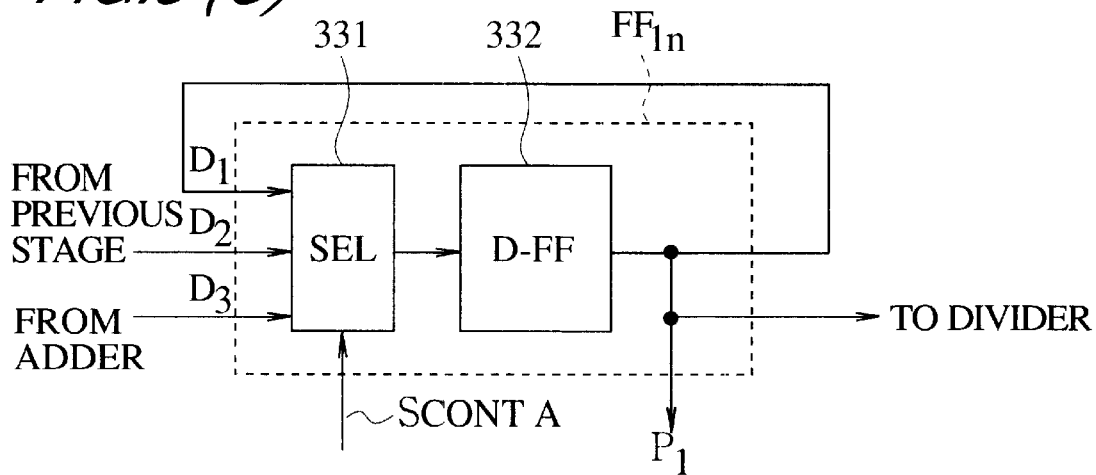

Next, the details of the constitution of the shift register portions 111 to 113 are explained using FIGS. 2 and 3.

The internal constitution of the shift register portions 111 to 113 is explained using FIG. 2.

As shown in FIG. 2, the shift register portion 111 comprises n stages of flip-flops $FF_{11}, FF_{12}, \ldots, FF_{1n}$.

The first stage flip-flop $FF_1$ comprises two input terminals $D_1, D_2$ and three output terminals $Q_1, Q_2, Q_3$. The flip-flops $FF_{12}$ to $FF_{1n}$, from the second stage onward, each comprise three input terminals $D_1, D_2, D_3$ and three output terminals $Q_1, Q_2, Q_3$. As discussed below, in each flip-flop $FF_{11}$ to $FF_{1n}$, the output terminals $Q_1, Q_2, Q_3$ output the same signal. Each terminal $D_1, D_2, D_3, Q_1, Q_2, Q_3$ inputs or outputs one or a plurality of bits of binary data at the same time.

In flip-flops $FF_{11}$ to $FF_{1n}$, the input terminal $D_1$ is connected to the output terminal $Q_1$ of that same flip-flop. The input terminal $D_2$ of the first stage flip-flop $FF_{11}$ inputs the abovementioned serial signal $S_3$ from the shift register portion 113. The input terminals $D_2$ of the flip-flops $FF_{12}$ to $FF_{1n}$ from the second stage onward are each connected to the output terminals $Q_1$ of the preceding flip-flops $FF_{11}$ to $FF_{1n-1}$. The input terminals $D_3$ of the flip-flops $FF_{12}$ to $FF_{1n}$ from the second stage onward are each connected to the output terminals of the adders $AD_1$ to $AD_{1-n}$ corresponding to those flip-flops.

As discussed above, the output terminals $Q_1$ of the first through (n−1)th flip-flops $FF_{11}$ to $FF_{1n-1}$ are each connected to the input terminals $D_2$ of the following flip-flops $FF_{12}$ to $FF_{1n}$ as well. Meanwhile, the output terminal $Q_1$ of the final flip-flop $FF_{1n}$ outputs the serial signal $S_1$. The output terminals $Q_2$ of the first through (n−1)th flip-flops $FF_{11}$ to $FF_{1n-1}$ are each connected to one of the input terminals of the corresponding adders $AD_1$ to $AD_{1-n}$. The output terminal $Q_2$ of the final flip-flop $FF_{1n}$ is connected to the dividend input terminal of the divider $DV_1$. The output terminals $Q_3$ of each flip-flop $FF_{11}$ to $FF_{1n}$ output signals to the shift register portion 113 and output portion 120; these signals constitute the parallel signal $P_1$.

The control signal $S_{CONTA}$ is input to each flip-flop $FF_{11}$ to $FF_{1n}$, but this is not shown in FIG. 2.

The other input terminals of the adders $AD_{11}$ to $AD_{1n-1}$ are each connected to the output terminals of the multipliers $MP_{11}$ to $MP_{1n-1}$. One of the input terminals of the multipliers $MP_{11}$ to $MP_{1n-1}$ is connected to the output terminal of the divider $DV_1$. The other input terminal of the multipliers $MP_{11}$ to $MP_{1n-1}$ and the divisor input terminal of the divider $DV_1$ input the corresponding signals of the parallel signal $P_2$. Each input terminal and each output terminal of each computing unit $AD_{11}$ to $AD_{1n-1}, MP_{11}$ to $MP_{1n-1}$ and $DV_1$ input or output one or a plurality of bits of binary data at the same time.

As clear from FIG. 2, the wiring of the shift register portions 112, 113 is the same as the case of the shift register portion 111 and an explanation is therefore omitted. The control signal $S_{CONTB}$ is input to the flip-flops $FF_{21}$ to $FF_{2n}$ and the control signal $S_{CONTC}$ is input to the flip-flops $FF_{31}$ to $FF_{3n}$; this is not shown in FIG. 2.

Next, the internal constitution of the flip-flops $FF_{11}$ to $FF_{1n}$ shown in FIG. 2 is explained using FIGS. 3(A)–3(C).

As shown in FIG. 3(A), the first flip-flop $FF_{11}$ comprises a selector 311 and data flip-flop 312. One input terminal of the selector 311 corresponds to the input terminal $D_1$ of the flip-flop $FF_{11}$, and consequently inputs the output signal from the flip-flop $FF_{11}$ itself from the output terminal $Q_1$. The other input terminal of the selector 311 corresponds to the input terminal $D_2$ of flip-flop $FF_{11}$ and consequently inputs serial signal $S_3$. The output of this selector 311 is selected according to the control signal $S_{CONTA}$. The data flip-flop 312 fetches the output signals of the selector 311 as timed by a clock, not shown. The output terminal of the data flip-flop 312 correspond to the output terminals $Q_1, Q_2, Q_3$ of the flip-flop $FF_{11}$ and consequently outputs signals sent to the next flip-flop $FF_{12}$, signals sent to the adder $AD_1$, and signals constituting the parallel signal $P_1$.

As shown in FIG. 3(B), the second through (n−1)th flip-flops $FF_{12}$ to $FF_{1n-1}$ comprise selectors 321, with three inputs, and data flip-flops 322. The first input terminal of the selector 321 corresponds to the input terminal $D_1$ and consequently inputs the output signal of the flip-flop itself. The second input terminal of the selector 321 corresponds to the input terminal $D_2$ and consequently inputs the output signal of the preceding flip-flop. The third input terminal of the selector 321 corresponds to the input terminal $D_3$ and consequently inputs the output, signal of the corresponding adder. The output of this selector 321 is selected according to the control signal $S_{CONTA}$. The data flip-flop 322 fetches the output signal of the selector 321 as timed by a clock, not shown. The output terminal of the data flip-flop 322 corresponds to the output terminals $Q_1$, $Q_2$, $Q_3$ of the flip-flop $FF_{11}$ and consequently outputs signals sent to the next flip-flop, signals sent to the next adder, and signals constituting the parallel signal $P_1$.

As shown in FIG. 3(C), the final flip-flop $FF_{1n}$ comprises a selector 331, with three inputs, and a data flip-flop 332. The first input terminal of the selector 331 corresponds to the input terminal $D_1$ and consequently inputs the output signal of this flip-flop $FF_{1n}$ itself. The second input terminal of the selector 331 corresponds to the input terminal $D_2$ and consequently inputs the output signal of the preceding flip-flop $FF_{1n-1}$. The third input terminal of the selector 331 corresponds to the input terminal $D_3$ and consequently input the output signal of the adder $AD_{1n-1}$. The output of this selector 331 is selected according to the control signal $S_{CONTA}$. The data flip-flop 332 holds the output signal of the selector 331 as timed by a clock, not shown. The output terminal of the data flip-flop 332 corresponds to the output terminals $Q_1$, $Q_2$, $Q_3$ of the flip-flop $FF_{1n}$ and consequently outputs the serial signal $S_1$, signals sent to the divider $DV_1$, and the signals constituting the parallel signal $P_1$.

The internal constitutions of the flip-flops $FF_{21}$ to $FF_{2n}$ and $FF_{31}$ to $FF_{3n}$ are the same as the internal constitutions of the flip-flops $FF_{11}$ to $FF_{1n}$ shown in FIGS. 3(A)–3(C); an explanation of those is therefore omitted.

Next, the principle of the operation of the shift register portions 111 to 113 is explained.

As discussed above, the shift register portions 111 to 113 are provided the dividend supplying function, divisor supplying function, and remainder computing function; the shift register portions execute these functions cyclically, switching among the functions with each operation.

An explanation will be given using the shift register portion 111 as an example.

The dividend supplying function is the function wherein the data stored in the shift register portion 111 are output as the dividend for the Euclid mutual division operation. When performing the dividend supplying function, the shift register portion 111 outputs the data stored in each of the flip-flops $FF_{11}$ to $FF_{1n}$ as the serial signal $S_1$. For performing this function, the selection signal $S_{CONTA}$ causes the selectors 311, 321, 331 (see FIG. 3) to select the input terminal $D_2$. Accordingly, the flip-flops $FF_{11}$ to $FF_{1n}$ constitute a general shift register and serially output the stored data as timed by a clock, not shown.

The divisor supplying function is the function wherein the data stored in the shift register portion 111 are output as the divisor for the Euclid mutual division operation. When performing the divisor supplying function, the shift register portion 111 outputs the data stored in each of the flip-flops $FF_{11}$ to $FF_{1n}$ as the parallel signal $P_1$. For this reason, the selection signal $S_{CONTA}$ causes the selectors 311, 321, 331 (see FIG. 3) to select the input terminal $D_1$. Accordingly, the flip-flops $FF_{11}$ to $FF_{1n}$ repeat the operation of fetching the data held therein; the stored data are therefore not shifted even when the clock is input. Consequently, the stored data are output as the parallel signal $P_1$ from the output terminal $Q_3$ of each flip-flop $FF_{11}$ to $FF_{1n}$.

The remainder computing function is the function wherein the divisor and dividend are input, the Euclid mutual division operation is performed, and the remainder is attained. When executing the remainder computing function, the shift register portion 111 inputs the serial signal $S_3$ as the dividend and inputs the parallel signal $P_2$ as the divisor. The selectors 311, 321, 321 are controlled by the selection signal $S_{CONTA}$ as discussed below. Accordingly, the Euclid mutual division operation is performed as discussed below.

The functions of the shift register portions 112, 113 are the same as the functions of the shift register portion 111; an explanation is therefore omitted.

Next, the entire operation of the Euclid mutual division arithmetic circuit 100 is explained.

As discussed above, each shift register portion 111, 112, 113 of the arithmetic circuit 100 can selectively perform the dividend supplying function, divisor supplying function, and remainder computing function. The shift register portions 111, 112, 113 switch among the functions performed each time the Euclid mutual division operation is completed. Below, the operation of the shift register portions 111, 112, 113 is explained for a kth operation (k+1)th operation, and (k+2)th operation (k=1, 4, 7, . . . ).

Figure 4:
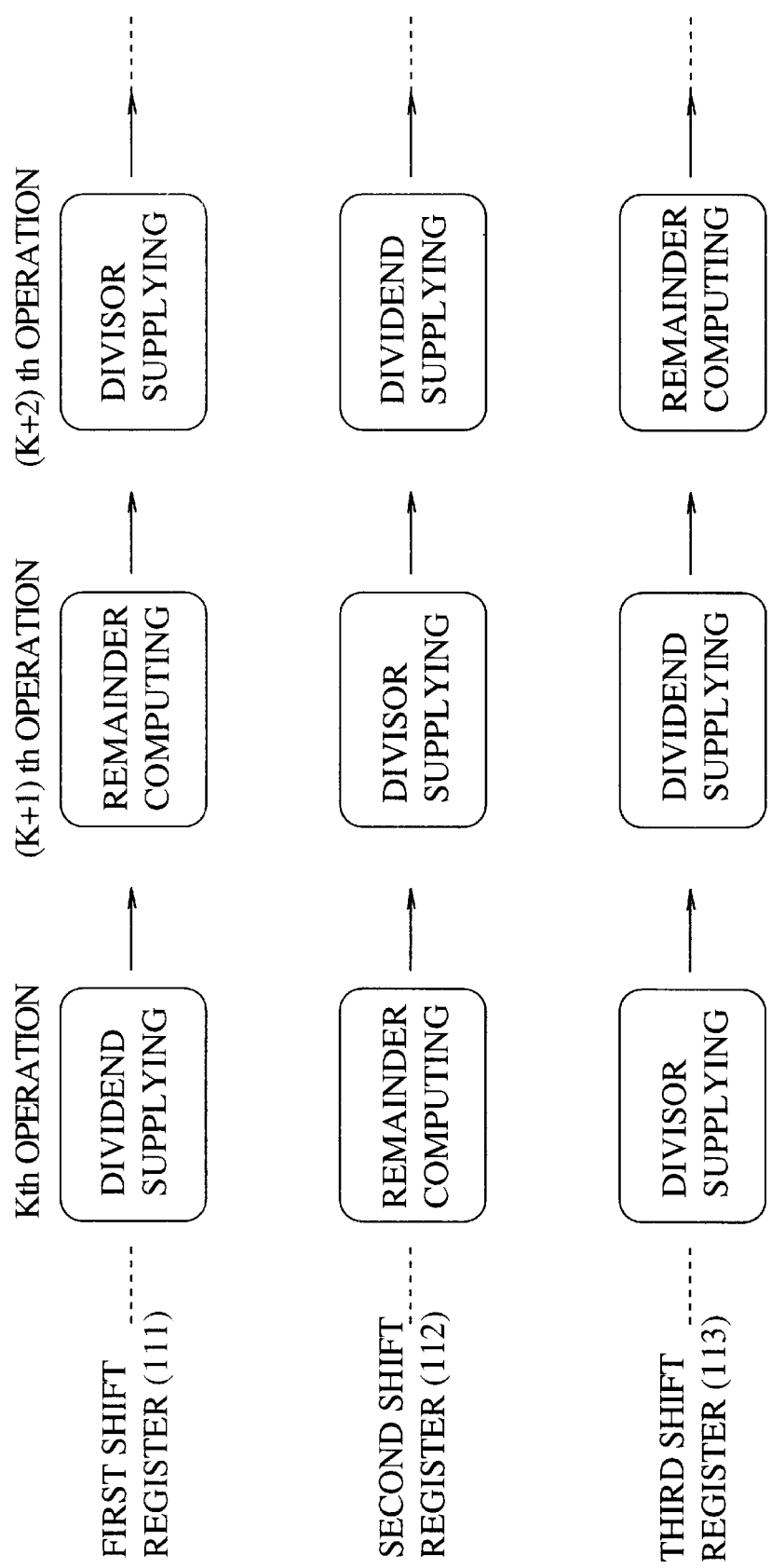
FIG. 4 is a conceptual diagram for explaining the operation of the Euclid mutual division arithmetic circuit relating to the first embodiment.

In the kth operation, as shown in FIG. 4, the shift register portion 111 performs the dividend supplying function, the shift register portion 112 performs the remainder computing function, and the shift register portion 113 performs the divisor supplying function. As discussed above, the function selected by each shift register portion 111, 112, 113 is determined according to the control signal $S_{CONTA}$, $S_{CONTB}$, $S_{CONTC}$ output from the control portion 130. The shift register portion 111 outputs the stored data as the serial signal $S_1$ and the shift register portion 113 outputs the stored data as the parallel signal $P_3$. The shift register portion 112 performs the division operation as below.

In this explanation, the dividend $n_k$ is expressed with equation (2) and the divisor $d_k$ is expressed with equation (3). In this case, when $C_2$, $C_1$, and $C_0$ are defined as in equations (5), (6), and (7), the remainder $r_k$, the result of the operation, is expressed with equation (4).

$$n_k = A_4X^4 + A_3X^3 + A_2X^2 + A_1X + A_0 \qquad (2)$$

$$d_k = B_3X^3 + B_2X^2 + B_1X + B_0 \qquad (3)$$

$$r_k = C_2X^2 + C_1X + C_0 \qquad (4)$$

$$C_2 = (A_2 + B_1 \cdot A_4/B_3) + B_2(A_3 + B_2 \cdot A_4/B_3) \qquad (5)$$

$$C_1 = (A_1 + B_0 \cdot A_4/B_3) + B_1(A_3 + B_2 \cdot A_4/B_3)/B_3 \qquad (6)$$

$$C_0 = A_0 + B_0 \cdot (A_3 + B_2 \cdot A_4/B_3)/B_3 \qquad (7)$$

In other words, in the case where the dividend $n_k$ has five terms, from the $0^{th}$ to fourth degree and the divisor $d_k$ has four terms from the $0^{th}$ to the third degree, the remainder $r_k$ then has three terms from the $0^{th}$ to the second degree. In this case, only the five final flip-flops $FF_{1n-4}$, $FF_{1n-3}$, $FF_{1n-2}$, $FF_{1n-}$, and $FF_{1n}$ are used in the shift register 111 storing the dividend, and only the four final flip-flops $FF_{3n-3}$, $FF_{3n-2}$, $FF_{3n-1}$, and $FF_{3n}$ are used in the shift register 113 storing the divisor. Essentially, only the three final flip-flops $FF_{2n-2}$, $FF_{2n-1}$, and $FF_{2n}$, the adders $AD_{2n-3}$, $AD_{2n-2}$, $AD_{2n-1}$ and multipliers $MP_{2n-3}$, $MP_{2n-2}$, $MP_{2n-1}$, and the divider $DV_2$ corresponding to these flip-flops are used in the shift register 112 performing the operation.

Before the kth operation begins, specifically at the time when the (k−1)th operation ends, the coefficients $A_0$, $A_1$, $A_2$, $A_3$, $A_4$ are stored in the flip-flops $FF_{1n-4}$, $FF_{1n-3}$, $FF_{1n-2}$, $FF_{1n-1}$, and $FF_{1n}$ of the shift register 111 and the coefficients $B_0$, $B_1$, $B_2$, $B_3$ are stored in the flip-flops $FF_{3n-3}$, $FF_{3n-2}$, $FF_{3n-1}$, and $FF_{3n}$ of the shift register 113. The coefficients $B_0$, $B_1$, $B_2$, $B_3$ stored in the shift register 113 are input as the parallel signal $P_3$ to the multipliers $MP_{2n-3}$, $MP_{2n-2}$, $MP_{2n-1}$, and the divider $DV_2$, established in the shift register 112. Meanwhile, the coefficients stored in the shift register 111 are input serially and in the following order to the shift register 112: $A_4$, $A_3$, $A_2$, $A_0$.

Once the first coefficient $A_4$ shifts in the shift register 112 and is fetched by the flip-flop $FF_{2n}$, the numerical value $A_4$ is supplied to the numerator input terminal of the divider $DV_2$. At this time, the numerical value $B_3$ is supplied to the denominator input terminal of the divider $DV_2$; the division result $A_4/B_3$ is then output from the divider $DV_2$. This numerical value $A_4/B_3$ is supplied to one input terminal of each multiplier $MP_1$ to $MP_{2n}$. As discussed above, the numerical values $B_0$, $B_1$, $B_2$ are supplied to the other input terminal of the multipliers $MP_{2n-3}$, $MP_{2n-2}$, $MP_{2n-1}$. Consequently, the multiplier $MP_{2n-3}$, outputs $B_0 \cdot A_4/B_3$ as the multiplication result, the multiplier $MP_{2n-2}$, outputs $B_1 \cdot A_4/B_3$ as the multiplication result, and the multiplier $MP_{2n-1}$, outputs $B_2 \cdot A_4/B_3$ as the multiplication result. These multiplication results are supplied to one of the input terminals of the adders $AD_{2n-3}$, $AD_{2n-2}$, $AD_{2n-1}$. At this time, the numerical value $A_1$ from the flip-flop $FF_{2n-2}$ is input to the adder $AD_{2n-2}$ via the other input terminal, the numerical value $A_2$ from the flip-flop $FF_{2n-1}$ is input to the adder $AD_{2n-2}$ via the other input terminal, and the numerical value $A_3$ from the flip-flop $FF_{2n}$ is input to the adder $AD_{2n}$ via the other input terminal. Consequently, the adder $AD_{2n-3}$ outputs $A_1 + B_2 \cdot A_4/B_3$ as the addition result, the adder $AD_{2n-2}$ outputs $A_2 + B_1 \cdot A_4/B_3$ as the addition result, and the adder $AD_{2n-1}$ outputs $A_3 + B_0 \cdot A_4/B_3$ as the addition result.

Next, the control portion 130 switches the input of the flip-flops $FF_{2n-2}$, $FF_{2n-1}$, $FF_{2n}$ to the terminal $D_3$. Thereby, as timed by the next clock, the flip-flop $FF_{2n-2}$ fetches the addition result of the adder $AD_{2n-1}$ the flip-flop $FF_{2n-1}$ fetches the addition result of the adder $AD_{2n-2}$, and the flip-flop $FF_{2n}$ fetches the addition result of the adder $AD_{2n-1}$.

Accordingly, the value $A_3 + B_0 \cdot A_4/B_3$ stored in the flip-flop $FF_{2n}$, is supplied to the numerator input terminal of the divider $DV_2$. Consequently, the value output by the divider $DV_2$ becomes $(A_3 + B_0 \cdot A_4/B_3)/B_3$. The multipliers $MP_{2n-3}$, $MP_{2n-2}$ $MP_{2n-1}$ input these values from one of the input terminals. As a result, the multiplier $MP_{2n-3}$ outputs $B_0 \cdot (A_3 + B_0 \cdot A_4/B_3)/B_3$ as the multiplication result, the multiplier $MP_{2n-2}$ outputs $B_1 \cdot (A_3 + B_0 \cdot A_4/B_3)/B_3$ as the multiplication result, and the multiplier $MP_{2n-1}$ outputs $B_2 \cdot (A_3 + B_0 \cdot A_4/B_3)/B_3$ as the multiplication result. At this time, the numerical value $A_0$ from the flip-flop $FF_{2n-1}$ is input to the adder $AD_{2n-2}$ via the other input terminal, the numerical value $A_1$ from the flip-flop $FF_{2n-1}$ is input to the adder $AD_{2n-1}$ via the other input terminal, and the numerical value $A_2$ from the flip-flop $FF_{2n}$ is input to the adder $AD_{2n}$ via the other input terminal. Consequently, the adder $AD_{2n-3}$ outputs $C_0$ as the addition result, the adder $AD_{2n-2}$ outputs $C_1$ as the addition result, and the adder $AD_{2n-1}$ outputs $C_2$ as the addition result (see equations (5) to (7)). At the next clock, the flip-flop $FF_{2n-2}$ fetches the addition result $C_0$, the flip-flop $FF_{2n-1}$ fetches the addition result $C_1$, and the flip-flop $FF_{2n}$ fetches the addition result $C_2$.

This ends the kth operation process.

When the kth operation is complete, the shift register portion 112 outputs the remainder, which is the result of the operation, as the parallel signal $P_2$. The output portion 120 inputs the parallel signals $P_1$, $P_2$, $P_3$. The output portion 120 determines from the control signals $S_{CONTA}$, $S_{CONTB}$, $S_{CONTC}$ that the parallel signal $P_3$ is the divisor data and the parallel signal $P_2$ is the remainder data, and outputs only the divisor data and remainder data to the subsequent circuit, not shown.

Next, the control portion 130 causes the shift register portions 111, 112, 113 to execute the (k+1)th operation. In the (k+1)th operation as shown in FIG. 4, the control signals $S_{CONTA}$, $S_{CONTB}$, $S_{CONTC}$ are established so that the shift register portion 111 performs the remainder computing function, the shift register portion 112 performs the divisor supplying function, and the shift register portion 113 performs the dividend supplying function.

In the (k+1)th operation, the dividend $n_{k+1}$ is expressed with equation (8) and the divisor $d_{k+1}$ is expressed with equation (9). In this operation, when $D_1$ and $D_0$ are defined as in equations (11) and (12), the remainder $r_{k+1}$, which is the result of the operation, is expressed with equation (10).

$$n_{k+1} = B_3 X^3 + B_2 X^2 + B_1 X + B_0 \tag{8}$$

$$d_{k-1} = C_2 X^2 + C_1 X + C_0 \tag{9}$$

$$r_{k+1} = D_1 X + D_0 \tag{10}$$

$$D_1 = (B_1 + C_0 \cdot B_3/C_2) + C_1(B_2 + C_1 \cdot B_2/C_2)/C_2 \tag{11}$$

$$D_0 = B_0 + C_0 \cdot (B_2 + C_1 \cdot B_3/C_2)/C_2 \tag{12}$$

In other words, in the (k+1)th operation, the dividend $n_{k+1}$ has four terms from the $0^{th}$ to the third degree and the divisor $d_{k+1}$ has three terms from the $0^{th}$ to the second degree; consequently, the remainder $r_{k+1}$ has two terms of the $0^{th}$ and first degree. In this case, only the four final flip-flops $FF_{3n-3}$, $FF_{3n-2}$, $FF_{3n-1}$, and $FF_{3n}$ are used in the shift register 113 storing the dividend, and only the three final flip-flops $FF_{2n-2}$, $FF_{2n-1}$, and $FF_{2n}$ are used in the shift register 112 storing the divisor. Essentially, only the two final flip-flops $FF_{1n-1}$, and $FF_{1n}$, the adders $AD_{1n-2}$, $AD_{1n-1}$ and multipliers $MP_{1n-2}$, $MP_{1n-1}$, and the divider $DV_1$ corresponding to these flip-flops are used in the shift register 111 performing the operation.

As discussed above, before the (k+1)th operation begins, specifically at the time when the kth operation ends, the coefficients $B_0$, $B_1$, $B_2$, $B_3$ are stored in the flip-flops $FF_{3n-3}$, $FF_{3n-2}$, $FF_{3n-1}$, and $FF_{3n}$ of the shift register 113 and the coefficients $C_0$, $C_1$, $C_2$ are stored in the flip-flops $FF_{2n-2}$, $FF_{2n-1}$, and $FF_{2n}$ of the shift register 112. The coefficients $C_0$, $C_1$, $C_2$ stored in the shift register 112 are input as the parallel signal $P_1$ to the divider $DV_1$ and multipliers $MP_{1n-2}$, $MP_{1n-1}$ established in the shift register 111. Meanwhile, the coefficients stored in the shift register 113 are input serially and in the following order to the shift register 111: $B_3$, $B_2$, $B_1$, $B_0$. In other words, the coefficients $C_2$, $C_1$, $C_0$ showing the remainder attained in the kth operation are used in the (k+1)th operation as coefficients showing the divisor without further processing or transfer of data. In addition, the coefficients $B_3$, $B_2$, $B_1$, $B_0$ showing the divisor in the kth operation are used in the (k+1)th operation as coefficients showing the dividend without further processing or transfer of data.

The operation of the shift register 111 is the same as the operation of the shift register 112 in the kth operation. Specifically, when the first coefficient $B_3$ shifts within the shift register 111 and reaches the flip-flop $FF_{1n}$, this numerical value $B_3$ is supplied to the numerator input terminal of the divider $DV_1$. The divider $DV_1$ accordingly outputs the numerical value $B_3/C_2$. The numerical values $C_0$ and $C_1$ are supplied to the other input terminals of the multipliers $MP_{1n-2}$, $MP_{1n-1}$. Consequently, the multiplier $MP_{1n-2}$ outputs $C_0 \cdot B_3/C_2$ as the multiplication result and the multiplier $MP_{1n-1}$, outputs $C_1 \cdot B_3/C_2$ as the multiplication result. These multiplication results are supplied to one of the input terminals of the adders $AD_{2n-2}$, $AD_{2n-1}$. At this time, the numerical value $B_1$ from the flip-flop $FF_{1n-1}$ is input to the adder $AD_{1n-1}$ via the other input terminal, and the numerical value $B_2$ from the flip-flop $FF_{2n}$ is input to the adder $AD_{2n}$ via the other input terminal. Consequently, the adder $AD_{1n-2}$ outputs $B_1 + C_0 \cdot B_3/C_2$ as the addition result and the adder $AD_{1n-1}$ outputs $B_2 + C_1 \cdot B_3/C_2$ as the addition result.

For this reason, when the control portion 130 switches the input of the flip-flops $FF_{1n-1}$, $FF_{1n}$, to the terminal $D_3$, the flip-flop $FF_{1n-1}$ fetches the addition results of the adder $AD_{1n-2}$ and the flip-flop $FF_{1n}$ fetches the addition results of the adder $AD_{1n-1}$, at the next clock. Consequently the value output by the divider $DV_1$ becomes $(B_2 + C_1 \cdot B_3/C_2)/C_2$. When this value is input, the multiplier $MP_{1n-2}$ outputs $C_0 \cdot (B_2 + C_1 \cdot B_3/C_2)/C_2$ and the multiplier $MP_{1n-1}$ outputs $C_1 \cdot (B_2 + C_1 \cdot B_3/C_2)/C_2$. The adder $AD_{1n-1}$ inputs the numerical value $B_0$ from the flip-flop $FF_{1n-1}$ and $C_0 \cdot (B_2 + C_1 \cdot B_3/C_2)/C_2$ from the multiplier $MP_{1n-2}$, outputs the addition result $D_0$. Also, the adder $AD_{1n}$ inputs the numerical value $B_1$ from the flip-flop $FF_{1n}$ and $C_1 \cdot (B_2 + C_1 \cdot B_3/C_2)/C_2$ from the multiplier $MP_{1n-1}$, and outputs the addition result $D_1$. Then, at the next clock, the flip-flop $FF_{1n-1}$ fetches the numerical value $D_0$ and the flip-flop $FF_{1n}$ fetches the numerical value $D_1$.

The processing of the (k+1)th operation thereby ends.

At the time when the (k+1)th operation ends, the shift register portion 111 outputs the remainder, which is the result of the operation, as the parallel signal $P_1$. The output portion 120 inputs each of the parallel signals $P_1$, $P_2$, $P_3$. The output portion 120 determines from the control signals $S_{CONTA}$, $S_{CONTB}$, $S_{CONTC}$ that the parallel signal $P_2$ is divisor data and the parallel signal $P_1$ is remainder data, and outputs only the divisor data and remainder data to the next level of circuitry, not shown.

Next, the control portion 130 causes the shift register portions 111, 112, 113 to perform the (k+2)th operation. In the (k+2)th operation as shown in FIG. 4, the control signals $S_{CONTA}$, $S_{CONTB}$, $S_{CONTC}$ are established so that the shift register portion 113 performs the remainder computing function, the shift register portion 111 performs the divisor supplying function, and the shift register portion 112 performs the dividend supplying function.

In the (k+2)th operation, the dividend $n_{k+2}$ is expressed with equation (13) and the divisor $d_{k+2}$ is expressed with equation (14). In this operation, when $E_0$ is defined as in equation (16), the remainder $r_{k+2}$, as the result of the operation, is expressed with equation (15).

$$n_{k+2} = C_2 X^2 + C_1 X + C_0 \qquad (13)$$

$$d_{k+2} = D_1 X + D_0 \qquad (14)$$

$$r_{k+2} = E_0 \qquad (15)$$

$$E_0 = C_0 + D_0 \cdot (C_1 + D_0 \cdot C_2/D_1)/D_1 \qquad (16)$$

In other words, in the (k+2)th operation, the dividend $n_{k+2}$ has three terms from the $0^{th}$ to the second degree and the divisor $d_{k+2}$ has two terms from the $0^{th}$ to the first degree; consequently, the remainder $r_{k+2}$ has one term of the $0^{th}$ degree. In this case, only the three final flip-flops $FF_{2n-2}$, $FF_{2n-1}$, and $FF_{2n}$ are used in the shift register 112 storing the dividend, and only the two final flip-flops $FF_{1n-1}$, and $FF_{1n}$ are used in the shift register 111 storing the divisor. Essentially, only the final flip-flop $FF_{3n}$, the adder $AD_{3n-1}$ and multiplier $MP_{3n-1}$, and the divider $DV_3$ corresponding to this flip-flop are used in the shift register 113 performing the operation.

As discussed above, before the (k+2)th operation begins, specifically at the time when the (k+1)th operation ends, the coefficients $C_0$, $C_1$, $C_2$ are stored in the flip-flops $FF_{2n-2}$, $FF_{2n-1}$, and $FF_{2n}$ of the shift register 112 and the coefficients $D_0$, $D_1$ are stored in the flip-flops $FF_{1n-1}$, and $FF_{1n}$ of the shift register 111. The coefficients $D_0$, $D_1$ stored in the shift register 111 are input as the parallel signal $P_1$ to the divider $DV_3$ and multiplier $MP_{1n-1}$, respectively, established in the shift register 113. Meanwhile, the coefficients stored in the shift register 112 are input serially and in the following order to the shift register 113: $C_2$, $C_1$, $C_0$. In other words, the coefficients $D_1$, $D_0$ showing the remainder attained in the (k+1)th operation are used in the (k+2)th operation as coefficients showing the divisor without further processing or transfer of data. In addition, the coefficients $C_2$, $C_1$, $C_0$ showing the divisor in the (k+1)th operation are used in the (k+2)th operation as coefficients showing the dividend without further processing or transfer of data.

The operation of the shift register 113 is the same as the operation of the shift registers 112, 111 in the (k+1)th operation. Specifically, when the first coefficient $C_2$ shifts within the shift register 111 and reaches the flip-flop $FF_{3n}$, this numerical value $C_2$ is supplied to the numerator input terminal of the divider $DV_3$. The divider $DV_3$ accordingly outputs the numerical value $C_2/D_1$. The numerical value $D_0$ is supplied to the other input terminal of the multiplier $MP_{3n-1}$. Consequently, the multiplier $MP_{3n-1}$ outputs $D_0 \cdot C_2/D_1$ as the multiplication result. This multiplication result is supplied to one of the input terminals of the adder $AD_{3n-1}$. At this time, the numerical value $C_1$ from the flip-flop $FF_{3n-1}$ is input to the adder $AD_{3n-1}$ via the other input terminal. Consequently, the adder $AD_{3n-1}$ outputs $C_1 + D_0 \cdot C_2/D_1$, or rather $E_0$, as the addition result.

When the control portion 130 switches the input of the flip-flops $FF_{3n-1}$, $FF_{3n}$ to the terminal $D_3$, the flip-flop $FF_{3n}$ fetches the addition result $E_0$ of the adder $AD_{3n-1}$ at the next clock.

The processing of the (k+2)th operation thereby ends.

At the time when the (k+2)th operation ends, the shift register portion 113 outputs the remainder, which is the result of the operation, as the parallel signal $P_3$. The output portion 120 inputs each of the parallel signals $P_1$, $P_2$, $P_3$. The output portion 120 determines from the control signals $S_{CONTA}$, $S_{CONTB}$, $S_{CONTC}$ that the parallel signal $P_1$ is divisor data and the parallel signal $P_3$ is remainder data, and outputs only the divisor data and remainder data to the next level of circuitry, not shown.

As explained above, the Euclid mutual division arithmetic circuit 100 in the present embodiment comprises three shift register portions which can perform the remainder computing function, dividend supplying function, and divisor supplying function, and can cyclically switch the function performed by each shift register at each operation. Consequently, it is not necessary to transfer the stored data among registers at each operation. As a result, the Euclid mutual division operation can be performed at high speeds.

In the present embodiment, the arithmetic circuit 100 is constituted so as to output the divisor and remainder, but it is also possible to constitute the arithmetic circuit 100 so as to output only one of these.

In addition, the present invention can also be applied to a Euclid mutual division arithmetic circuit constituted to output the quotient as the output data. The quotient is output as serial signals $P_1$, $P_2$, $P_3$ from the dividers $DV_1$, $DV_2$, $DV_3$.

Furthermore, the arithmetic circuit 100 can also be constituted for serial output of the output data such as the divisor and remainder.

So long as it can perform the operations discussed above, the internal constitution of the control portion 130 is not limited. A general purpose microprocessor may be used as the control portion 130. Memory for storing information, such as the tables showing the relative allocations of the functions performed by each shift register portion, can also be used as the control portion 130.

Second Embodiment

Figure 5:
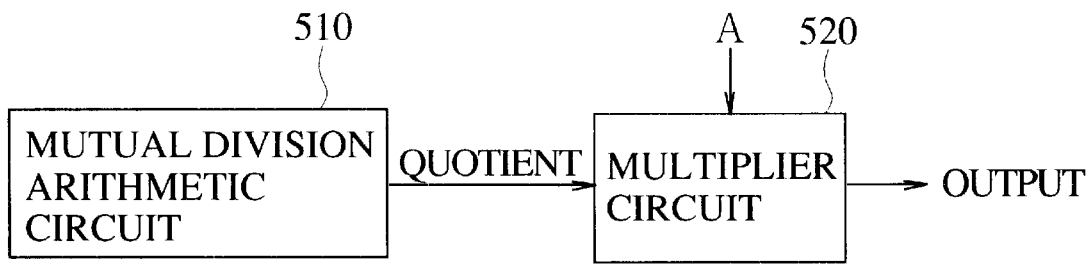
FIG. 5 is a block diagram showing the entire constitution of the processing circuit relating to the second embodiment.
Figure 6:
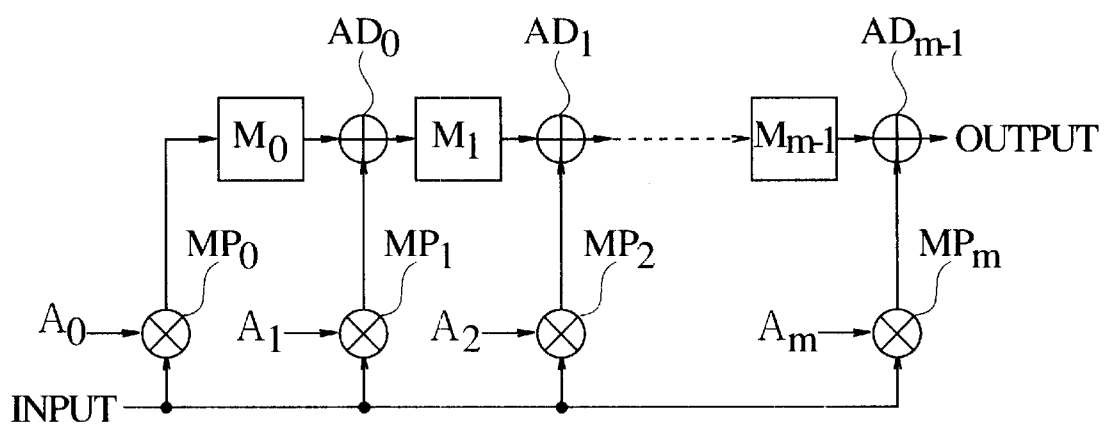
FIG. 6 is a circuit diagram showing the internal constitution of the multiplier circuit shown in FIG. 5.

An embodiment of the processing circuit relating to the present invention is explained using FIGS. 5 and 6.

As shown in FIG. 5, the processing circuit in the present embodiment comprises a Euclid mutual division arithmetic circuit 510 and multiplier circuit 520.

The internal structure of the mutual division arithmetic circuit 510 is the same as the circuit 100 in the first embodiment. However, the mutual division arithmetic circuit 510 outputs the quotient attained by performing the Euclid mutual division operation. As discussed above, the quotient is attained as the output of dividers $DV_1, DV_2, DV_3$ (see FIG. 2).

The multiplier circuit 520 performs multiplication of an arbitrary numerical value A input from outside the processing circuit and the quotient input from the mutual division arithmetic circuit.

FIG. 6 shows an example of the internal constitution of the multiplier circuit 520.

As shown in FIG. 6, the multiplier circuit comprises m latch circuits $M_0$ to $M_{m-1}$, m adders $AD_0$ to $AD_{m-1}$, and m+1 multipliers $MP_0$ to $MP_m$.

The first latch circuit $M_0$ inputs the operation results of the multiplier $MP_0$. Also, the latch circuits $M_1$ to $M_{m-1}$, from the second latch circuit onwards, input the operation results of the adders $AD_0$ to $AD_{m-1}$ respectively.

The adders $Ad_0$ to $AD_{m-1}$, each input the latch data of the preceding latch circuits $M_0$ to $M_{m-1}$ via one input terminal and input the operation results of the multipliers $MP_1$ to $MP_m$ via the other input terminal. The adders $AD_0$ to $AD_{m-2}$ output the addition results to the following latch circuits $M_0$ to $M_{m-1}$. The final adder $AD_{m-1}$ outputs the addition results, as the operation results of the multiplier circuit 520, to outside the processing circuit.

The multipliers $MP_0$ to $MP_m$ each input the corresponding coefficient $A_0$ to $A_m$ of the number A. In addition, the multipliers $MP_0$ to $MP_m$ input data comprising the quotient in sequence from the algorithm arithmetic circuit 510. The multipliers $M_0$ to $MP_m$ then output the multiplication results of the data input from both input terminals.

The maximum degree m of the number A is determined according to the maximum value of the quotient. Consequently, the number of latch circuits, adders, and multipliers is determined according to this maximum value.

As understood from FIG. 6, the multiplier circuit 520 can perform multiplication parallel to the operation of the algorithm arithmetic circuit 510. In other words, the multiplier circuit 520 can perform the multiplication processing corresponding to the number of digits, upon the calculation of each digit of the quotient, rather than starting operations after the end of the calculation of the quotient by the algorithm arithmetic circuit 510. Consequently, it is possible to perform the entire operation in a short period of time.

The processing circuit of the present embodiment can be applied to circuits for error correction of Reed-Solomon codes using Euclid mutual division. An error locator polynomial and error evaluator polynomial are used for error correction of Reed-Solomon codes. The error locator polynomial and error evaluator polynomial can be attained by multiplying prescribed numbers by the quotient attained with Euclid mutual division. The processing can be performed at high speeds in the case of calculating the error locator polynomial and error evaluator polynomial using the processing circuit of the present embodiment.

What is claimed is:

1. A Euclid mutual division arithmetic circuit comprising:

first, second, and third register means for selectively executing a Euclid mutual division operation using a divisor and dividend, supplying the divisor used in said Euclid mutual division operation, and supplying the dividend used in said Euclid mutual division operation; and means for controlling said first, second, and third register means so that in a kth operation, said first register means performs said dividend supplying, said second register means executes said division operation, and said third register means performs said divisor supplying; in a (k+1)th operation, said first register means executes said division operation, said second register means performs said divisor supplying, and said third register means performs said dividend supplying; and in a (k+2)th operation, said first register means performs said divisor supplying function, said second register means performs said dividend supplying, and said third register means executes said division operation.

2. The Euclid mutual division arithmetic circuit according to claim 1, wherein said first, second, and third register means comprise n levels of flip-flops for storing coefficients $\alpha_{n-1}, \alpha_{n-2}, \ldots, \alpha_1, \alpha_0$, for specifying the value $\alpha_{n-1}X^{n-1} + \alpha_{n-2}X^{n-2} + \ldots + \alpha_1X + \alpha_0$, as one bit or a plurality of bits of binary data.

3. The Euclid mutual division arithmetic circuit according to claim 2, wherein said first, second, and third register means comprise:

dividers which receive the output of the final flip-flop as the numerator and the highest degree coefficient of said divisor as the denominator;

n−1 multipliers which receive the $0^{th}$ to (n−2)th degree coefficients of said divisor via one input terminal and the output of said divider via the other input terminal;

n−1 adders, respectively corresponding to the n−1 multipliers, which respectively receive the output of the first n−1 levels of flip-flops corresponding thereto via the one input terminal and the output of the multipliers corresponding thereto via the other input terminal;

a first selector, established in the first flip-flop, for selecting and inputting said coefficient of said dividend or the output of the flip-flop itself; and second selectors, established in the second through final flip-flops, for selecting and inputting the output of the preceding flip-flop, the output of the flip-flop itself, or the output of the adder corresponding to said preceding flip-flop.

4. The Euclid mutual division arithmetic circuit according to claim 3, wherein said control means switch among the functions executed by said first, second, and third register means, by switching the inputs of said first selector and said second selectors.

5. The Euclid mutual division arithmetic circuit, according to claim 4, wherein said control means cause said first, second, and third register means to perform said division operation by causing said first selector to select the input of said coefficient while causing said second selector to select the output of said preceding flip-flop, until said highest degree coefficient is fetched by said final flip-flop, and then by causing said second selector to select the output of said adder after said highest degree coefficient is fetched by said final flip-flop.

6. The Euclid mutual division arithmetic circuit according to claim 4, wherein said control means cause said first, second, and third register means to perform said divisor supplying by causing said first and second selector to select the output of the flip-flop itself.

7. The Euclid mutual division arithmetic circuit, according to claim 4, wherein said control means cause said first, second, and third register means to perform said dividend supplying by causing said second selector to select the output of said preceding flip-flop.

8. The Euclid mutual division arithmetic circuit according to claim 1, further comprising means for outputting any or all of said divisor, said dividend, a remainder as a result of the operation, and a quotient as a result of the Euclid mutual division operation, output from said first, second, and third register means.

9. The Euclid mutual division arithmetic circuit according to claim 8, wherein said outputting means use a function selecting signal transmitted from said control means to said first, second, and third register means, and distinguish from among the first, second, and third register means the register means for outputting said divisor, the register means for outputting said dividend, and the register means for outputting the results of said operation.

10. A processing circuit comprising:
   a Euclid mutual division arithmetic circuit comprising first, second, and third register means for selectively executing a Euclid mutual division operation using a divisor and dividend, a function for supplying the divisor used in said Euclid mutual division operation, and supplying the dividend used in said Euclid mutual division operation; and means for controlling said first, second, and third register means so that so that in a kth operation, said first register means performs said dividend supplying, said second register means executes said, division operation and said third register means performs said divisor supplying; in a (k+1)th operation, said first register means executes said division operation, said second register means performs said divisor supplying, and said third register means performs said dividend supplying; and in a (k+2)th operation, said first register means performs said divisor supplying, said second register means performs said dividend supplying function, and said third register means executes said division operation; and
   a multiplier circuit for multiplying a quotient calculated by the Euclid mutual division arithmetic circuit by a prescribed number.

11. The processing circuit, according to claim 10, wherein said first, second, and third register means comprise n levels of flip-flops for storing coefficients $\alpha_{n-1}, \alpha_{n-2}, \ldots, \alpha_1, \alpha_0$, for specifying the value $\alpha_{n-1}X^{n-1}+\alpha_{n-2}X^{n-2}+\ldots+\alpha_1X+\alpha_0$, as one bit or a plurality of bits of binary data.

12. The processing circuit, according to claim 11, wherein said first, second, and third register means comprise:
   dividers which receive the output of the final flip-flop as the numerator and the highest degree coefficient of said divisor as the denominator;
   n−1 multipliers which receive the $0^{th}$ to (n−2)th degree coefficients of said divisor via one input terminal and the output of said divider via an other input terminal;
   n−1 adders, respectively corresponding to the n−1 multipliers, which respectively receive the output of the first n−1 levels of flip-flops corresponding thereto, via the one input terminal and the output of the multipliers corresponding thereto via the other input terminal;
   a first selector, established in the first flip-flop, for selecting and inputting said coefficient of said dividend or the output of the flip-flop itself; and
   second selectors, established in the second through final flip-flops, for selecting and inputting the output of the preceding flip-flop, the output of the flip-flop itself, or the output of the adder corresponding to said preceding flip-flop.

13. The processing circuit, according to claim 12, wherein said control means switch among the functions executed by said first, second, and third register means, by switching the inputs of said first selector and said second selectors.

14. The processing circuit, according to claim 13, wherein said control means cause said first, second, and third register means to perform said division operation by causing said first selector to select the input of said coefficient while causing said second selector to select the output of said preceding flip-flop, until said highest degree coefficient is fetched by said final flip-flop, and then by causing said second selector to select the output of said adder after said highest degree coefficient is fetched by said final flip-flop.

15. The processing circuit, according to claim 13, wherein said control means cause said first, second, and third register means to perform said divisor supplying by causing said first and second selector to select the output of the flip-flop itself.

16. The processing circuit according to claim 13, wherein said control means cause said first, second, and third register means to perform said dividend supplying by causing said second selector to select the output of said preceding flip-flop.

17. The processing circuit, according to claim 10, wherein said control means sends a function selection signal to said first, second, and third register means, further comprising means for selecting one of said first, second, and third register means for outputting said quotient.

18. The processing circuit according to claim 10, wherein said multiplier circuit comprises:
   m+1 multipliers which receive any of $0^{th}$ through mth degree coefficients of said prescribed number via one input terminal and the coefficients of said quotient in order via an other input terminal;
   first through mth ordered adders, wherein the first adder adds calculation results of a first of the m+1 multipliers to calculation results of a second of the m+1 multipliers and
   the second through mth adders add any of calculation results of the m+1 multipliers, other than the first and second multipliers, with the calculation results from the preceding adder.

19. The processing circuit, according to claim 18, wherein said multiplier circuit comprises m latch elements for latching addition results data input from said first and second adders.

20. The processing circuit, according to claim 10, wherein said multiplier circuit is a circuit for computing Reed-Solomon codes using the quotient from the Euclid mutual division operation.

* * * * *